(12) United States Patent
Mènard et al.

(10) Patent No.: US 8,115,579 B2
(45) Date of Patent: Feb. 14, 2012

(54) MEMS ACTUATORS WITH STRESS RELEASING DESIGN

(75) Inventors: Stéphane Mènard, Kirkland (CA); Nicolas Gonon, Dorval (CA)

(73) Assignee: Reseaux MEMS, societe en commandite, Montreal (CA)

( * ) Notice: Subject to any disclaimer, the term of this patent is extended or adjusted under 35 U.S.C. 154(b) by 30 days.

(21) Appl. No.: 12/839,708

(22) Filed: Jul. 20, 2010

(65) Prior Publication Data

US 2011/0012705 A1   Jan. 20, 2011

Related U.S. Application Data

(63) Continuation of application No. 11/882,460, filed on Aug. 1, 2007, now abandoned.

(51) Int. Cl.
*H01H 51/22* (2006.01)
(52) U.S. Cl. ............. 335/78; 200/181; 310/306; 60/527
(58) Field of Classification Search .................... 335/78; 200/181; 60/527, 528; 310/306–307
See application file for complete search history.

(56) References Cited

U.S. PATENT DOCUMENTS

| 6,407,478 | B1 * | 6/2002 | Wood et al. ................... 310/307 |
| 6,608,714 | B2 * | 8/2003 | Hanson et al. ................ 359/296 |
| 6,708,491 | B1 * | 3/2004 | Weaver et al. ................. 60/527 |
| 7,036,312 | B2 * | 5/2006 | Menard et al. ................ 60/527 |
| 7,312,678 | B2 * | 12/2007 | Ning et al. ..................... 335/78 |
| 7,471,184 | B1 * | 12/2008 | Aksyuk et al. ................... 337/1 |
| 7,733,200 | B2 * | 6/2010 | Aksyuk et al. ................. 60/527 |
| 2005/0146404 | A1 * | 7/2005 | Yeatman ........................ 335/78 |
| 2005/0189204 | A1 * | 9/2005 | Yeatman et al. .............. 200/181 |
| 2006/0238279 | A1 * | 10/2006 | Lu et al. ........................ 200/181 |
| 2007/0170811 | A1 * | 7/2007 | Rubel ........................... 310/307 |

* cited by examiner

*Primary Examiner* — Bernard Rojas
(74) *Attorney, Agent, or Firm* — Alexandre Abecassis; Fasken Martineau DuMoulin LLP

(57) ABSTRACT

The micro-electromechanical (MEMS) actuator comprises a hot arm member and a cold arm member. The cold arm member comprises at least two longitudinally spaced-apart flexors. The actuators may also be constructed with at least one among the hot arm member and the cold arm member comprising at least one spring section. The stress in this improved MEMS actuator is more uniformly distributed, thereby reducing the mechanical creep and improving its reliability as well as its operation life.

14 Claims, 3 Drawing Sheets

MEMS ACTUATORS WITH STRESS RELEASING DESIGN

CROSS REFERENCE TO RELATED APPLICATION

This application is a continuation of U.S. patent application Ser. No. 11/882,460 filed Aug. 1, 2007.

TECHNICAL FIELD

The technical field relates to Micro-Electromechanical Systems (MEMS) and in particular to actuators for chip level MEMS devices.

BACKGROUND

MEMS devices are small movable mechanical structures advantageously constructed using semiconductor processing methods. Oftentimes MEMS devices are provided as actuators and have proven quite useful in a wide variety of applications.

A MEMS actuator is oftentimes configured and disposed in a cantilever fashion. Accordingly, it thus has an end attached to a substrate and an opposite free end suspended above the substrate. The free end is movable between at least two positions, one being a neutral position and the other(s) being deflected positions.

Common actuation mechanisms used in MEMS actuators include electrostatic, magnetic, piezo and thermal, the last of which is the primary focus of the improvements presented hereafter. The deflection of a thermal MEMS actuator results from a potential being applied between a pair of terminals—commonly called "anchor pads" in the art—which potential causes a current flow elevating the temperature of the structure. This in turn causes a part thereof to either elongate or contract, depending upon the particular material(s) used.

A known use of thermal MEMS actuators is to configure them as switches. Such MEMS switches offer numerous advantages over alternatives and in particular, they are extremely small, relatively inexpensive, consume little power and exhibit short response times.

Examples of MEMS actuators and switches can be found in U.S. Pat. No. 7,036,312 issued May 2, 2006 to Stephane MENARD et al., which patent is hereby incorporated by reference.

Given the importance of thermally actuated MEMS devices, new designs enhancing their performance, reliability and/or manufacturability always represent a significant advance in the art.

SUMMARY

In accordance with one aspect of the improved design, there is provided a micro-electromechanical (MEMS) actuator comprising a hot arm member and a cold arm member. The cold arm member comprises at least two longitudinally spaced-apart flexors.

In accordance with another aspect of the improved design, there is provided a micro-electromechanical (MEMS) switch comprising: a first cantilever MEMS actuator comprising a first hot arm member, a first cold arm member and a first dielectric tether attaching together a free end of the first hot arm member and a free end of the first cold arm member; a second cantilever MEMS actuator comprising a second hot arm member, a second cold arm member and a second dielectric tether attaching together a free end of the second hot arm member and a free end of the second cold arm member; and at least two longitudinally spaced-apart flexors positioned on the cold arm member of at least one among the first and the second MEMS actuator.

In accordance with another aspect of the improved design, there is provided a micro-electromechanical (MEMS) actuator mounted on a substrate, the MEMS comprising a hot arm member and a cold arm member. At least one among the hot arm member and the cold arm member comprises at least one spring section.

In accordance with another aspect of the improved design, there is provided a micro-electromechanical (MEMS) switch comprising: a first cantilever MEMS actuator attached to a substrate and comprising a first hot arm member, a first cold arm member and a first dielectric tether attached to a free end of the first hot arm member and a free end of the first cold arm member; a second cantilever MEMS actuator attached to the substrate and comprising a second hot arm member, a second cold arm member and a second dielectric tether attached to a free end of the second hot arm member and a free end of the second cold arm member; and at least one spring section positioned on at least one among the hot arm member and the cold arm member of at least one of the MEMS actuators.

DETAILED DESCRIPTION

Figure 1:
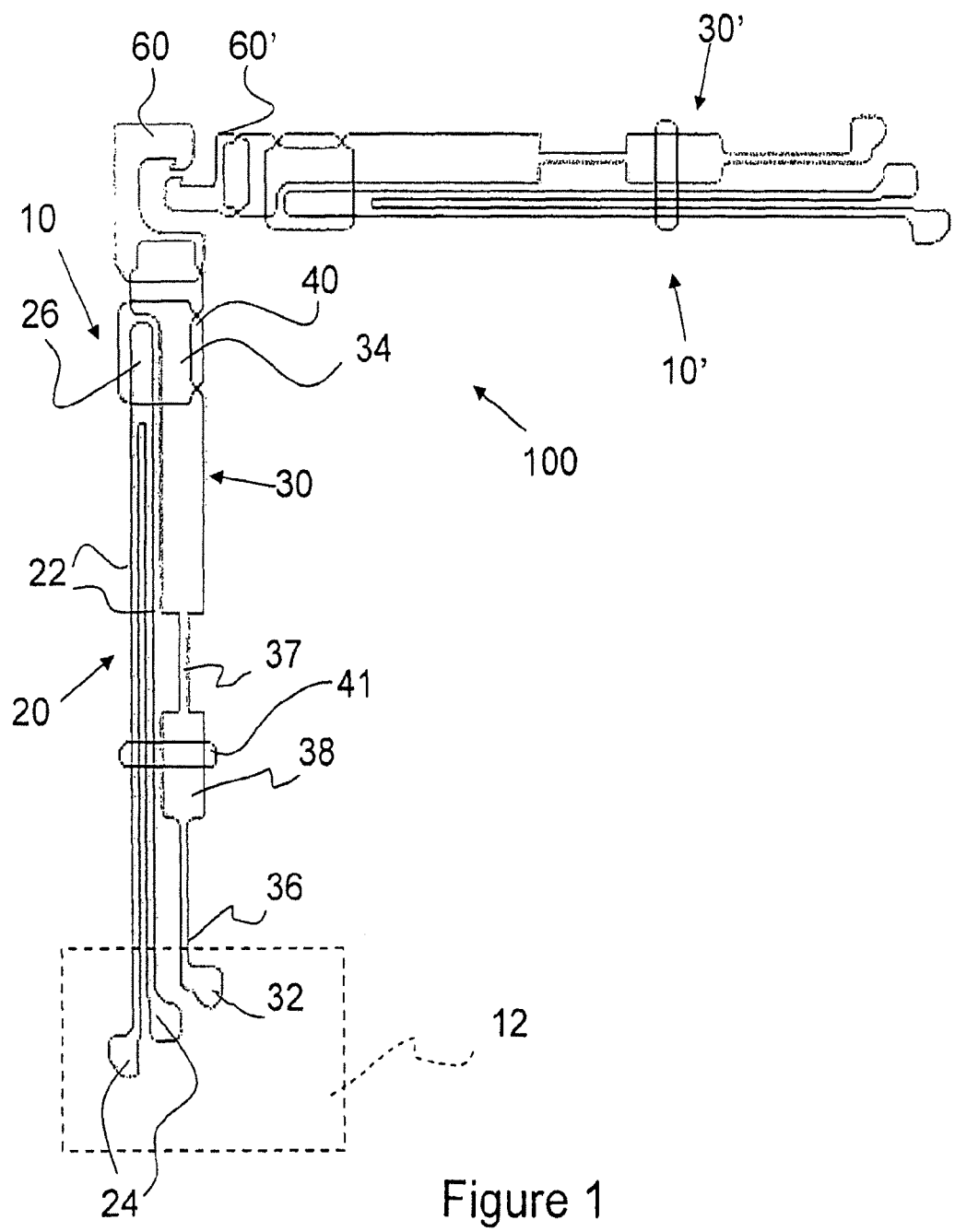
FIG. 1 is a plan view of a representative example of an improved MEMS actuator with a cold arm member having two spaced-apart flexors.

FIG. 1 shows an example of a micro-electromechanical (MEMS) cantilever actuator 10 as improved herein. The actuator 10 comprises a hot arm member 20 including two spaced-apart portions 22, each being provided at one end with a corresponding anchor pad 24 attached to a substrate, which substrate is schematically represented by reference numeral 12. The substrate 12 is oftentimes significantly larger than illustrated. The spaced-apart portions 22 may be substantially parallel as shown in FIG. 1. They are connected together at a common free end 26 that is opposite the anchor pads 24. The free end 26 is suspended above the substrate 12. The anchor pads 24 are offset since one of the portions 22 is slightly longer than the other.

The actuator 10 also comprises a cold arm member 30 adjacent and substantially parallel to the hot arm member 20. The cold arm member 30 has at one end an anchor pad 32 connected to the substrate 12, and a free end 34 that is opposite the anchor pad 32 thereof. The free end 34 is suspended above the substrate 12.

In the illustrated example, a dielectric tether 40 is attached to the free end 26 of the hot arm member 20 and the free end 34 of the cold arm member 30. As can be appreciated, the dielectric tether 40 mechanically couples the hot arm member 20 and the cold arm member 30 while keeping them electrically isolated, thereby maintaining them in a spaced-apart relationship with a minimum spacing between them to avoid a direct contact or a short circuit in normal operation as well as to maintain the required withstand voltage, which voltage is roughly proportional to the spacing between the members 20,30.

In the embodiment shown in FIG. 1, the cold arm member 30 comprises a narrower section 36 adjacent to its anchor pad 32 in order to facilitate the movement between the deflected position and the neutral position. The narrower section 36 is called flexor.

When a control voltage is applied at the anchor pads 24 of the hot arm member 20, an electrical current flows into both the first and the second portions 22 thereby heating the whole member 20. In the illustrated example, the material used for making the hot arm member 20 is selected such that it increases in length as it is heated. The cold arm member 30, however, does not elongate since there is no current initially flowing through it and therefore, it is not actively heated. As a result of the hot-arm member 20 increasing in length and the cold arm member 30 staying substantially the same length, the free end of the actuator 10 is deflected sideward, thereby moving the actuator 10 from a neutral position to a deflected position. Conversely, when the control voltage is removed, the hot arm member 20 cools and shortens in length. As a result, the actuator 10 returns to its neutral position. Both movements may occur very rapidly.

One use for the MEMS actuator 10 is to provide two or more of such actuators 10 to create a switch 100. In FIG. 1, two substantially-perpendicular actuators 10,10' are used. The second actuator 10' is substantially identical to the other actuator 10. It should be noted, however, that the two actuators 10,10' can be constructed differently than what is shown. In the illustrated example, tip members 60,60' at the end of the actuators 10,10' are each connected to an electrical conductor, such as the cold arm members 30,30', to convey electrical power or a signal when the switch 100 is closed.

FIG. 1 shows a cold arm configuration where the cold arm member 30 exhibits two longitudinally spaced-apart flexors 36,37. One flexor 36 is proximal to the anchor pad 32 while the second flexor 37 is distal from the anchor pad 32, for instance being provided near the middle of the cold arm member 30. The two flexors 36,37 are separated by a wider portion 38. With this design, the stress is more uniformly distributed into the cold arm member 30 when the actuator 10 is deflected. Less local stress is present, thereby reducing the mechanical creep and improving the reliability and operation life of each actuator. The particular materials chosen and the application will dictate the characteristics of the first flexor 36, the wider portion 38, and the second flexor 37. In particular, the width and length of first flexor 36 may be different than the width and length of second flexor 37. Flexors 36,37 may also exhibit tapered configuration, as shown in U.S. patent application Ser. No. 11/677,322 filed Feb. 21, 2007.

In the illustrated example, the wider portion 38 of the cold arm member 30 is attached to the adjacent hot arm member 20 with an additional tether 41.

Figure 2:
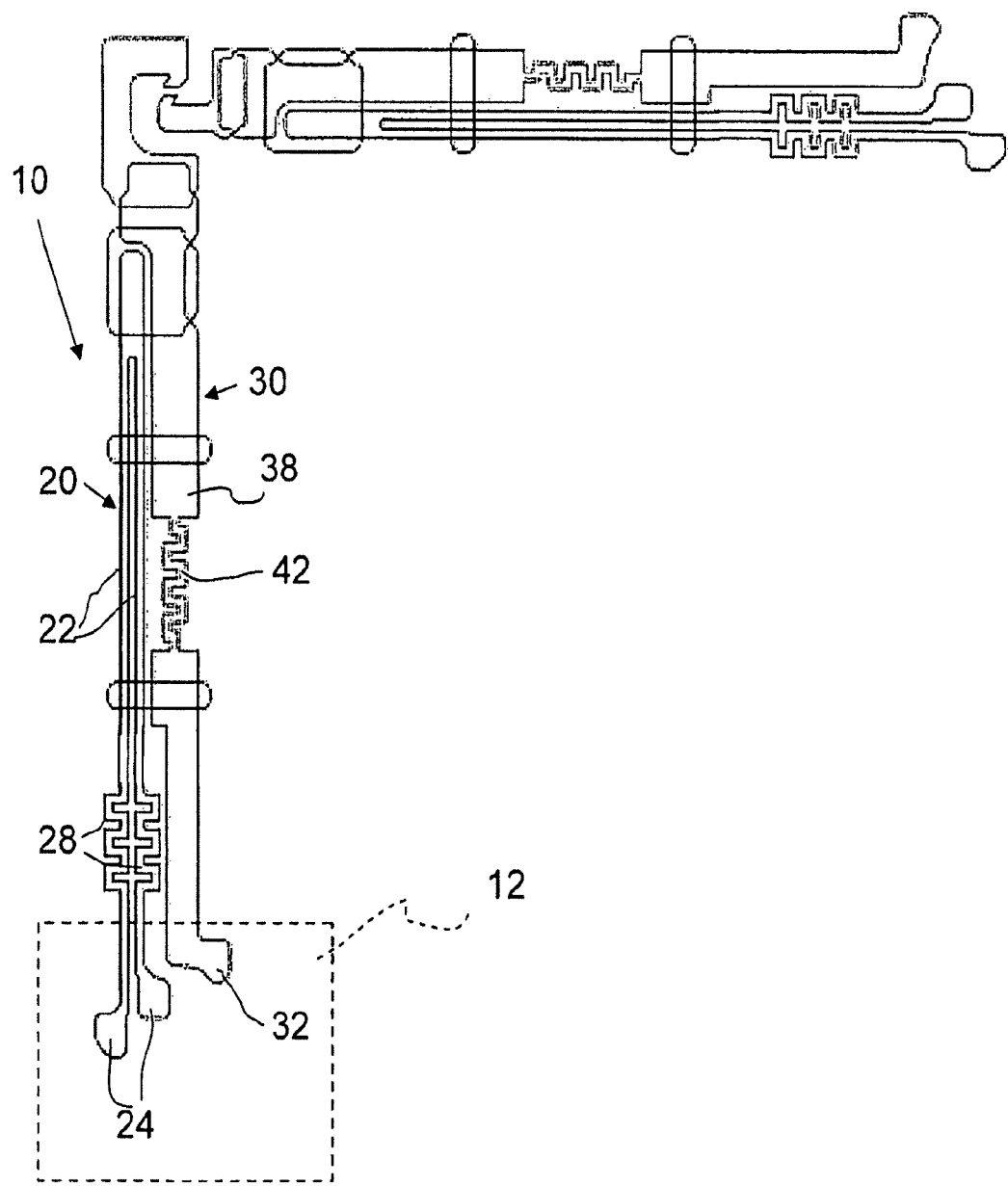
FIG. 2 is a plan view of a representative example of an improved MEMS actuator with spring sections on the hot and cold arm members.

FIG. 2 shows another example of a MEMS actuator 10. In the illustrated embodiment, each hot arm portion 22 comprises a spring section 28 proximal to the anchor pads 24. The cold arm 30 also comprises a spring section 42 into about the middle of its wider portion 38. The spring section is, for instance, a zigzag pattern of a plurality of substantially perpendicularly-disposed segments. It provides more local flexibility to the hot arm member 20 and the cold arm member 30. With this design, the stress is more uniformly distributed into each actuator, thereby reducing the mechanical creep and improving its reliability and its operation life. If desired, the spring section can be only in the hot arm member 20 or only in the cold arm member 30, depending on the exact requirements.

Also in the illustrated embodiment, the spring sections 28 of the hot arm member 20 are symmetrically-disposed with reference to the longitudinal axis thereof. There are also very close to the anchor pads 24.

Figure 3:
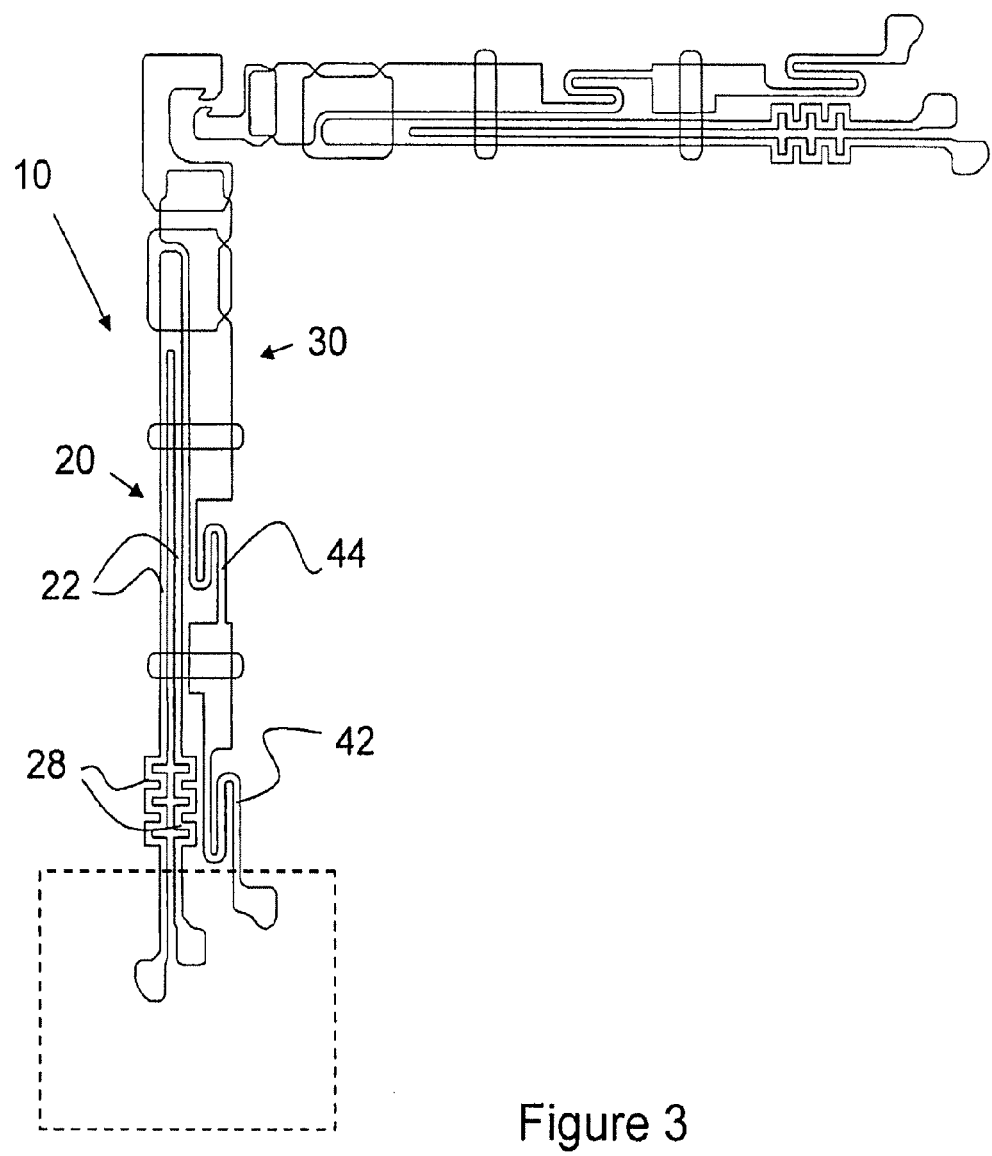
FIG. 3 is a plan view of another representative example of an improved MEMS actuator with spring sections on the hot and cold arm members.

FIG. 3 shows another example of a MEMS actuator 10. In the illustrated embodiment, each hot arm portion 22 also comprises a spring section 28. The cold arm 30 comprises two spaced-apart spring sections 42,44 having an arc-shaped zigzag pattern.

It must be understood that the improvements are not limited to the illustrated examples and various changes and modifications may be effected therein without departing from the scope of the appended claims. For instance, the actuators of a same MEMS switch can be different. More than two flexors can be provided on a same cold arm member. The exact shape of the various parts can be different. The spring sections have another aspect than a zigzag pattern, this including other non-linear shapes providing a spring behavior. More than one spaced-apart spring section can be provided on a same arm. The spring section can also be provided on only the cold arm member or only on the hot arm member. Other equivalents can be devised as well using the teachings of the present specification and the appended figures.

What is claimed is:

1. A micro-electromechanical (MEMS) actuator comprising:
a hot arm member;
a cold arm member;
wherein the cold arm member comprises at least two longitudinally spaced-apart flexing portions, each of the at least two longitudinally spaced-apart flexing portions having a width substantially equal.

2. The MEMS actuator of claim 1, wherein one of the flexing portions is adjacent to an end of the cold arm member that is anchored to a substrate.

3. The MEMS actuator of claim 1, wherein the two flexing portions have a different length.

4. The MEMS actuator of claim 1, wherein the hot arm member comprises two spaced-apart portions, each provided at one end with a corresponding anchor pad connected to a substrate, the portions of the hot arm member being connected together at a common free end that is opposite their anchor pads.

5. The MEMS switch of claim 4, wherein the cold arm member comprises an anchor pad connected to the substrate, one of the flexing portions being adjacent to the anchor pad of the cold arm member.

6. The MEMS switch of claim 1, wherein the flexing portions of the cold arm member are separated by a wider portion of the cold arm member, the wider portion being attached to the hot arm member by a tether.

7. The MEMS actuator as claimed in claim 1, wherein each of the flexing portions comprises a spring section.

8. The MEMS actuator as claimed in claim 7, wherein each of the spring sections comprises a plurality of segments configured in zigzags.

9. The MEMS actuator as claimed in claim 8, wherein the zigzags are substantially at a right angle.

10. A micro-electromechanical (MEMS) switch comprising:
a first cantilever MEMS actuator comprising a first hot arm member, a first cold arm member and a first dielectric tether attaching together a free end of the first hot arm member and a free end of the first cold arm member;

a second cantilever MEMS actuator comprising a second hot arm member, a second cold arm member and a second dielectric tether attaching together a free end of the second hot arm member and a free end of the second cold arm member; and at least two longitudinally spaced-apart flexing portions positioned on the cold arm member of at least one among the first and the second MEMS actuator, each of the at least two longitudinally spaced-apart flexing portions having a width substantially equal.

11. The MEMS switch of claim 10, wherein the at least two spaced-apart flexing portions of a same cold arm member are separated by a wider portion of the cold arm member, the wider portion being attached to the corresponding hot arm member by an additional tether.

12. The MEMS switch as claimed in claim 10, wherein each of the flexing portions comprises a spring section.

13. The MEMS switch as claimed in claim 12, wherein each of the spring sections comprises a plurality of segments configured in zigzags.

14. The MEMS switch as claimed in claim 13, wherein the zigzags are substantially at a right angle.

* * * * *